(12) United States Patent
Akuzawa et al.

(10) Patent No.: US 7,232,776 B2
(45) Date of Patent: Jun. 19, 2007

(54) SURFACE MATERIAL FOR AN AUTOMOBILE INTERNAL TRIM PANEL AND AUTOMOBILE INTERNAL TRIM PANEL

(75) Inventors: Masaaki Akuzawa, Shiga (JP); Masami Nakano, Shiga (JP); Akira Utsumi, Shiga (JP)

(73) Assignee: Japan Vilene Company, Ltd., Tokyo (JP)

( * ) Notice: Subject to any disclaimer, the term of this patent is extended or adjusted under 35 U.S.C. 154(b) by 323 days.

(21) Appl. No.: 10/424,771

(22) Filed: Apr. 29, 2003

(65) Prior Publication Data

US 2003/0203687 A1 Oct. 30, 2003

(30) Foreign Application Priority Data

Apr. 30, 2002 (JP) .............................. 2002-128786

(51) Int. Cl.
*B32B 27/04* (2006.01)
*B32B 27/12* (2006.01)
*B32B 5/02* (2006.01)

(52) U.S. Cl. ........................... 442/92; 442/80; 442/91; 442/381; 442/394; 442/402; 428/365; 428/375; 428/392

(58) Field of Classification Search .................. 442/91, 442/381, 394, 402, 80, 92; 428/365, 375, 428/392
See application file for complete search history.

(56) References Cited

U.S. PATENT DOCUMENTS

| 4,474,846 | A | * | 10/1984 | Doerer et al. ................ 442/415 |
| 4,696,830 | A | * | 9/1987 | Obayashi et al. ............ 427/491 |
| 4,828,910 | A | * | 5/1989 | Haussling .................... 442/391 |
| 4,888,235 | A | * | 12/1989 | Chenoweth et al. ......... 442/342 |
| 4,960,827 | A | * | 10/1990 | Miyazaki et al. ............ 525/131 |
| 6,756,332 | B2 | * | 6/2004 | Sandoe et al. ............... 442/344 |

* cited by examiner

*Primary Examiner*—Norca L. Torres Velazquez
(74) *Attorney, Agent, or Firm*—Sughrue Mion, PLLC

(57) ABSTRACT

Disclosed is a surface material for an automobile internal trim panel consisting of a fiber sheet, wherein the fiber sheet contains an oil repellent and substantially consists of non-water absorbent fibers; an oil repellency of at least one surface of the surface material is grade 1 or more in an evaluation by an AATCC Test Method 118-1997; and a grade of the oil repellency of one surface of the surface material is different from that of the other surface thereof. Further, an automobile internal trim panel comprising the same is also disclosed.

6 Claims, 2 Drawing Sheets

SURFACE MATERIAL FOR AN AUTOMOBILE INTERNAL TRIM PANEL AND AUTOMOBILE INTERNAL TRIM PANEL

BACKGROUND OF THE INVENTION

1. Field of the Invention

The present invention relates to a material for covering a surface of an automobile internal trim panel (hereinafter referred to as a surface material), and an automobile internal trim panel comprising the surface material. The automobile internal trim panel of the present invention can be used as, for example, a headlining, a pillar, a door trim, or a rear package.

2. Description of the Related Art

Recently, an automobile internal trim panel prepared by adhering and integrating a surface material made of an entangled nonwoven fabric and a substrate for reinforcing the surface material was developed as an automobile internal trim panel having a soft feeling and a pleasing appearance. For example, an automobile internal trim panel wherein a substrate comprises three layers of a polyurethane foam layer, a glass-fibers layer, and a backing layer; a surface material is made of a needle-punching-entangled nonwoven fabric; and the substrate and the surface material are integrated by fusion of a hot-melt film, is known. In the above automobile internal trim panel, the surface material of the needle-punching-entangled nonwoven fabric rarely becomes dirty, because of the suppression of a natural air convection within an automobile, in addition to the fusion integration by the hot-melt film. However, problems of the automobile with such an internal trim panel have been pointed out, in that the noise is loud in the inside of the automobile, and thus, the sound absorption is poor. It was found that these problems are caused by a reflection of sounds generated within the automobile room, from the hot-melt film.

Therefore, an automobile internal trim panel prepared by forming a polyurethane-based resin from a reaction of a liquid isocyanate and water, and adhering and integrating a surface material and a substrate with the polyurethane-based resin, instead of the hot-melt film, was proposed. However, in some cases, the polyurethane-based resin may permeate through the surface material to reach at the exposed surface of the surface material. The exposed surface means that the surface is exposed to the inside of the automobile. If the polyurethane-based resin reaches the exposed surface of the surface material, the exposed surface of the surface material is yellowed with time, and thus, the appearance of the room of the automobile is affected. Also there were problems in that a sufficient adhesiveness is not obtained between the surface material and the substrate, and the surface material of an automobile internal trim panel is liable to become dirty.

Further, Japanese Unexamined Patent Publication No. 61-141542 disclosed that a conjugated nonwoven fabric having a dual-layered structure of a needle-punched water-repellant nonwoven fabric sheet and a needle-punched super water absorbent nonwoven fabric sheet is used as the surface material of an automobile internal trim panel. However, the surface material of the conjugated nonwoven fabric contains super water absorbent fibers, and has an excellent water-absorption property. Therefore, it is supposed that although the reaction between liquid isocyanate and water is necessary for an adhering treatment with the substrate, the reaction is inhibited, and an adhesiveness of the surface material and the substrate is affected. In working Examples of the above Publication No. 61-141542, a needle-punched non-woven fabric treated with a water-repellant and a needle-punched nonwoven fabric containing super water absorbent fibers are entangled with needle-punching and integrated. Although detailed procedures of the needle-punching treatment are not disclosed in the above Publication No. 61-141542, it is most probable that the needle-punching treatment was conducted onto the side of the water-repellant nonwoven fabric sheet. This is because, if the needle-punching treatment was conducted onto the side of the nonwoven fabric sheet containing the super water absorbent fibers, the super water absorbent fibers invade the water-repellant nonwoven fabric, and the water-repellency is deteriorated. When the needle-punching treatment produces prominent punched holes on the side onto which the needle-punching treatment is conducted, i.e., on the needle-punched nonwoven fabric treated with a water-repellant. Therefore, there was a defect in the surface material from a decorative point of view. Further, if an mass per unit area of the surface material is decreased to about 220 g/m$^2$ or less to reduce the weight thereof, improve mileage, and reduce manufacturing costs, the needle-punched nonwoven fabric treated with a water-repellant is inevitably thinned, and thus, the needle-punched nonwoven fabric containing super water absorbent fibers easily becomes transparent. In general, super water absorbent fibers are white, and such a thinness will affect the decorativeness.

Further, Japanese Unexamined Patent Publication No. 5-254070 discloses an automobile internal trim panel prepared by dipping a fabric in a water-repellant solution to impregnate the inside of the fabric with the water-repellant; heating the fabric to dry; then coating the fabric with a backing agent comprising a ultraviolet-curing resin as a main ingredient on a reverse side of the fabric; and irradiating the fabric with a ultraviolet ray to solidify the backing agent. However, when the automobile internal trim panel is used as a surface material, the whole fabric forming the automobile internal trim panel contains the water-repellant, and thus, the polyurethane-based resin may permeate the internal trim panel, as shown in Comparative Example 1 in the present specification. Therefore, the exposed surface of the internal trim panel is yellowed with time, and thus, the appearance of the room of the automobile is affected.

SUMMARY OF THE INVENTION

Accordingly, the object of the present invention is to remedy the above disadvantages of the conventional surface materials, and to provide, in the first instance, a surface material through which a polyurethane-based resin does not permeate, when the surface material is adhered to and integrated with a substrate by the polyurethane-based resin stemmed from liquid isocyanate to obtain a sound absorption property.

Another object of the present invention is to provide a surface material capable of providing a sufficient adhesiveness with a substrate.

Still another object of the present invention is to provide an automobile internal trim panel having not only an excellent sound absorption property, but also equipped with a surface material which rarely becomes dirty.

In accordance with the present invention, there is provided a surface material for an automobile internal trim panel consisting essentially of a fiber sheet, wherein the fiber sheet contains an oil repellent and substantially consists of non-water absorbent fibers; an oil repellency of at least one surface of the surface material is grade 1 or more in an evaluation by an AATCC Test Method 118-1997; and a grade of the oil repellency of one surface of the surface material is different from that of the other surface thereof.

In the surface material of the present invention, at least one surface thereof exhibits an excellent oil repellency, and thus a polyurethane-based resin cannot pass through the surface material. The present inventors have found that a surface material for an automobile internal trim panel wherein a surface thereof does not yellow for a long time can be manufactured. Further, because the fiber sheet constituting the surface material substantially consists of non-water absorbent fibers, when liquid isocyanate is reacted with water, and the surface material and the base material are adhered to each other with the polyurethane-based resin formed by the reaction, the water to be reacted with liquid isocyanate is not absorbed by the non-water absorbent fibers, and thus the polyurethane-based resin can be effectively formed. As a result, the surface material and the base material are strongly adhered to each other with the polyurethane-based resin. Furthermore, because a grade of the oil repellency of one surface of the surface material is different from that of the other surface thereof, when the surface having a lower grade of oil repellency is brought into contact with the base material, the polyurethane-based resin can easily penetrate the surface material, and thus an automobile internal trim panel wherein the surface material and the base material are strongly adhered to each other may be manufactured.

The term "polyurethane-based resin" as used herein means a resin having at least one bond selected from the group consisting of a urethane bond (—NHCOO—), a urea bond (—NHCONH—), and a biuret bond (—NHCON-CONH—). The urethane bond may be formed by, for example, a reaction of di-isocyanate and glycol. The urea bond may be formed by, for example, a reaction of di-isocyanate and water. The biuret bond may be formed by, for example, a reaction of di-isocyanate and a compound having the urea bond.

According to a preferred embodiment of the surface material of the present invention, a water repellency of at least one surface of the surface material is two points or more in an evaluation by a water repellency test (a spray test) JIS L 1092:1998 6.2. According to the embodiment, when liquid isocyanate is reacted with water, and the surface material and the base material are adhered to each other with the polyurethane-based resin formed by the reaction, the surface material can prevent water from passing therethrough, and thus can effectively prevent the polyurethane-based resin from passing therethrough.

According to another preferred embodiment of the surface material of the present invention, the fiber sheet consists essentially of an entangled nonwoven fabric. According to the embodiment, an automobile internal trim panel exhibiting a soft texture, a pleasing appearance, and an excellent wear resistance can be manufactured.

According to still another preferred embodiment of the surface material of the present invention, the entangled nonwoven fabric has a substantially uniform fiber combination. According to the embodiment, the surface material and the base material are sufficiently adhered to each other, because a ply separation in the surface material does not easily occur.

According to still another preferred embodiment of the surface material of the present invention, the fiber sheet has a density-gradient structure. According to the embodiment, the high-density area can effectively prevent the polyurethane-based resin from passing through the surface material. Particularly, when the oil repellent is contained in the high-density area, a synergistic effect of the high-density structure as a physical action and the oil repellent as a chemical action can more effectively prevent the polyurethane-based resin from passing therethrough. Further, when the high-density area is contained within the fiber sheet, the surface material and the base material are sufficiently adhered to each other, because the polyurethane-based resin easily penetrates the low-density area.

In accordance with the present invention, there is further provided an automobile internal trim panel (hereinafter sometimes referred to as an "internal trim panel") comprising the surface material of the present invention and a base material, wherein the surface material and the base material are adhered to each other with a polyurethane-based resin having at least one chemical bond selected from the group consisting of a urethane bond, a urea bond, and a biuret bond; and the polyurethane-based resin does not leak to a surface of the surface material, which is opposite to a surface at the side of the base material. In the automobile internal trim panel of the present invention, a surface of the surface material at the side of a passenger compartment does not yellow for a long time, and thus the appearance thereof is excellent. Further, a sound absorption is also excellent.

According to a preferred embodiment of the automobile internal trim panel of the present invention, a non-permeable film is carried on a surface of the base material, which is opposite to a surface at the side of the surface material. According to the embodiment, in addition to the above effects, a soiling of the surface material is almost completely prevented by inhibiting an air permeability.

DESCRIPTION OF THE PREFERRED EMBODIMENTS

Figure 1:
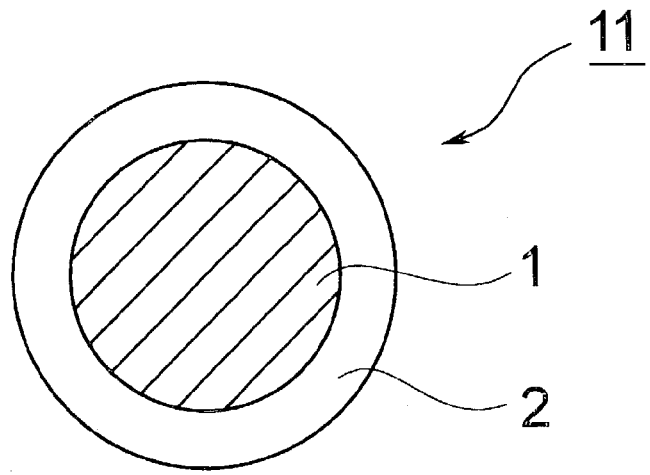
FIG. 1 is a schematic cross-sectional view of a core-sheath type composite fiber which may be used to manufacture the surface material of the present invention.

The surface material of the present invention consists of a fiber sheet containing an oil repellent. An oil repellency of at least one surface of the surface material is grade 1 or more in an evaluation by an AATCC Test Method 118-1997, and thus the surface material can prevent a polyurethane-based resin from passing therethrough. As the grade of the oil repellency is higher, the polyurethane-based resin is more effectively prevented from passing through the surface material. The grade is preferably grade 2 or more, more preferably grade 3 or more, still further preferably grade 4 or more, still further preferably grade 5 or more, still further preferably grade 6 or more, still further preferably grade 7 or more, most preferably grade 8. Only one surface of the surface material or both surfaces thereof may be a surface having grade 1 or more.

In the surface material of the present invention, the oil repellency grade of one surface of the surface material is different from that of the other surface thereof. When the grade of the surface at the side of the base material is lower, the polyurethane-based resin can easily penetrate the surface material, and thus an automobile internal trim panel wherein the surface material and the base material are strongly adhered to each other can be manufactured. Particularly, it is preferable that the oil repellency of one surface of the surface material is grade 1 or more (more preferably grade 2 or more, still further preferably grade 3 or more, still further preferably grade 4 or more, still further preferably grade 5 or more, still further preferably grade 6 or more, still further preferably grade 7 or more, most preferably grade 8) and that of the other surface is grade 0. In this case, the polyurethane-based resin can easily penetrate the surface material from the surface having grade 0. The surface material in which the oil repellency grade of one surface is different from that of the other surface may be prepared, for example, by adding the oil repellent to only one surface of the surface material, or immersing only one surface of the surface material in the oil repellent.

In the surface material of the present invention, it is preferable that a water repellency of at least one surface of the surface material is two points or more in an evaluation by a water repellency test (a spray test) JIS L 1092:1998 6.2. In this case, when liquid isocyanate is reacted with water, and the surface material and the base material are adhered to each other with the polyurethane-based resin formed by the reaction, the surface material can effectively prevent the polyurethane-based resin from passing therethrough, by preventing water from passing therethrough. The higher the point of the water repellency is, the better the effect. The water repellency point is preferably three points or more, more preferably four points or more, most preferably five points. Only one surface of the surface material, or both surfaces thereof, may be a surface having two points or more.

The water repellency point of one surface of the surface material and that of the other surface thereof may be same or different. When they are different and the water repellency point of the surface at the side of the base material is lower, when liquid isocyanate is reacted with water, and the surface material and the base material are adhered to each other with the polyurethane-based resin formed by the reaction, the polyurethane-based resin can easily penetrate the surface material, and thus an automobile internal trim panel wherein the surface material and the base material are strongly adhered to each other can be manufactured. This embodiment is preferable. Particularly, it is more preferable that the water repellency point of one surface of the surface material is two points or more (still further preferably three points or more, still further preferably four points or more, most preferably five points) and that of the other surface thereof is one point. Where the water repellency point of one surface of the surface material is different from that of the other surface thereof, when the surface having a lower water repellency point is brought into contact with the base material, the polyurethane-based resin can easily penetrate the surface material, and thus an automobile internal trim panel wherein the surface material and the base material are strongly adhered to each other may be manufactured. The surface material in which the water repellency point of one surface is different from that of the other surface may be prepared, for example, by adding the oil repellent, which may function as the water repellent, to only one surface of the surface material, or immersing only one surface of the surface material in the oil repellent.

The surface wherein the oil repellency of the surface material is grade one or more (i.e., the surface wherein the oil repellency is a higher grade) and the surface wherein the water repellency is two points or more (i.e., the surface wherein the water repellency is a higher point) may be the same or different. Particularly, it is preferable that they are the same, when liquid isocyanate is reacted with water, and the surface material and the base material are adhered to each other with the polyurethane-based resin formed by the reaction. In this case, the surface material can effectively prevent the polyurethane-based resin from passing therethrough, by a synergistic effect of the oil repellency and the water repellency. Therefore, it is most preferable that the oil repellency and the water repellency of one surface are grade one or more (preferably grade 2 or more, more preferably grade 3 or more, still further preferably grade 4 or more, still further preferably grade 5 or more, still further preferably grade 6 or more, still further preferably grade 7 or more, most preferably grade 8) and two points or more (preferably three points or more, more preferably four points or more, still further preferably five points), and those of the other surface are grade 0 and one point, respectively. As the above surface material, there may be mentioned, for example, a surface material wherein an oil repellent does not exist at one surface of the surface material, a surface material wherein different kinds of oil repellents and/or different amounts of oil repellents exist at each of both surfaces, a surface material wherein an oil repellent exists at one surface and a water repellent exists at the other surface, or a surface material wherein a density of one surface is different from that of the other surface. In this connection, an oil repellent may be function as a water repellent, and thus it is possible that a desired water repellency may be added by using only an oil repellent.

The fiber sheet constituting the surface material of the present invention substantially consists of only non-water absorbent fibers. The expression "substantially consist of only" as used herein means that the subject fibers account for preferably 80 mass % or more, more preferably 90 mass % or more, more preferably 95 mass % or more, most preferably 100 mass %, with respect to the whole mass of fibers forming the fiber sheet. In the surface material of the present invention essentially consisting of only non-water absorbent fibers, when liquid isocyanate is reacted with water, and the surface material and the base material are adhered to each other with the polyurethane-based resin formed by the reaction, the adhesive action of the polyurethane-based resin is not lost. More particularly, if a fiber sheet contains water absorbent fibers, the water to be reacted with liquid isocyanate is absorbed by the water absorbent fibers. As a result, a sufficient amount of polyurethane-based resin is not formed, and thus the surface material and the base material are not strongly adhered to each other. In contrast, in the surface material of the present invention essentially consisting of only non-water absorbent fibers, the water is not absorbed by the non-water absorbent fibers, and thus a sufficient amount of polyurethane-based resin is formed. As a result, the surface material and the base material are strongly adhered to each other.

The term "non-water absorbent fiber" as used herein means a fiber in which an official regain is 1% or less. As the non-water absorbent fiber, there may be mentioned, for example, a polyester-based fiber, a polyethylene-based fiber, a polypropylene-based fiber, a polyvinyl chloride-based fiber, a polyvinylidene chloride-based fiber, an acrylic fiber, or an ethylene-vinyl acetate copolymer-based fiber. The above fibers may be used singly or in combination thereof. Of the above fibers, the polyester-based fiber is preferable, because a heat resistance and a weathering resistance thereof are excellent.

As a water absorbent fiber which may be contained as a minor component in the fiber sheet constituting the surface material of the present invention, there may be mentioned, for example, a thermoplastic fiber (such as a polyamide fiber) or a non-melt fiber (such as, a rayon fiber, a cupra fiber, an acetate fiber, a polyvinyl alcohol fiber, a cotton fiber, a jute fiber, or an aromatic polyamide fiber). The fibers may be used singly or in combination thereof.

As fibers (including non-water absorbent fibers and water absorbent fibers) forming the fiber sheet, the fiber sheet preferably comprises fusible fibers consisting of one or more resins. When the fusible fibers are fused, a wear resistance of the fiber sheet (i.e., a wear resistance of the surface material) can be improved. Particularly, a fusible fiber containing a fusible component and a non-fusible component which does not fuse at the melting point of the fusible component is preferable, because the non-fused component can keep the fiber shape, and thus the wear resistance of the surface material can be further improved.

Figure 2:
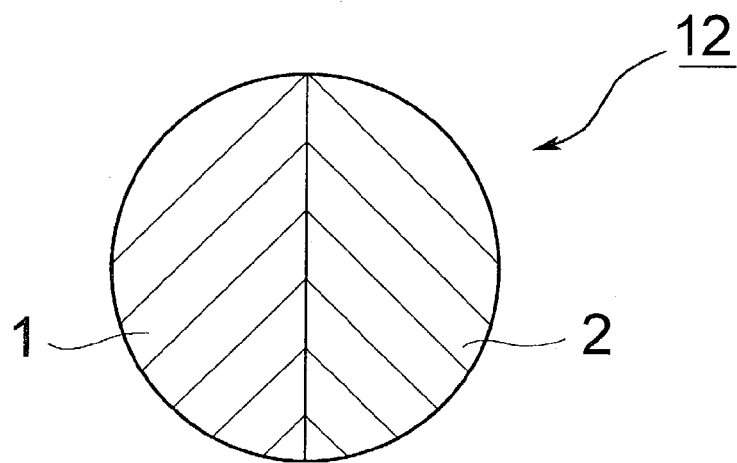
FIG. 2 is a schematic cross-sectional view of a side-by-side type composite fiber which may be used to manufacture the surface material of the present invention.
Figure 3:
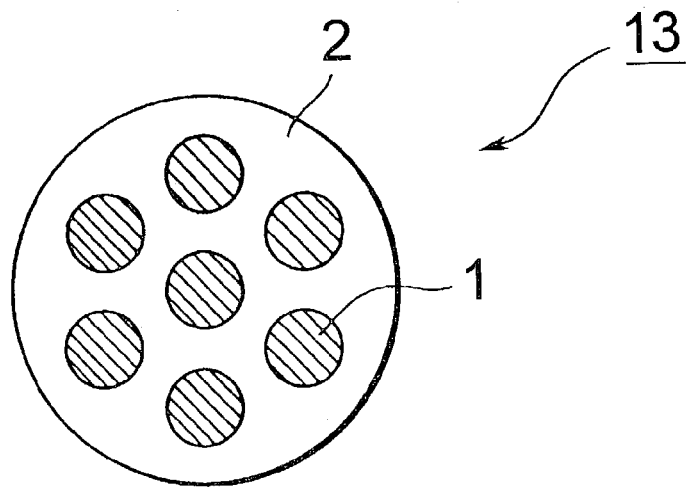
FIG. 3 is a schematic cross-sectional view of an islands-in-sea type composite fiber which may be used to manufacture the surface material of the present invention.
Figure 4:
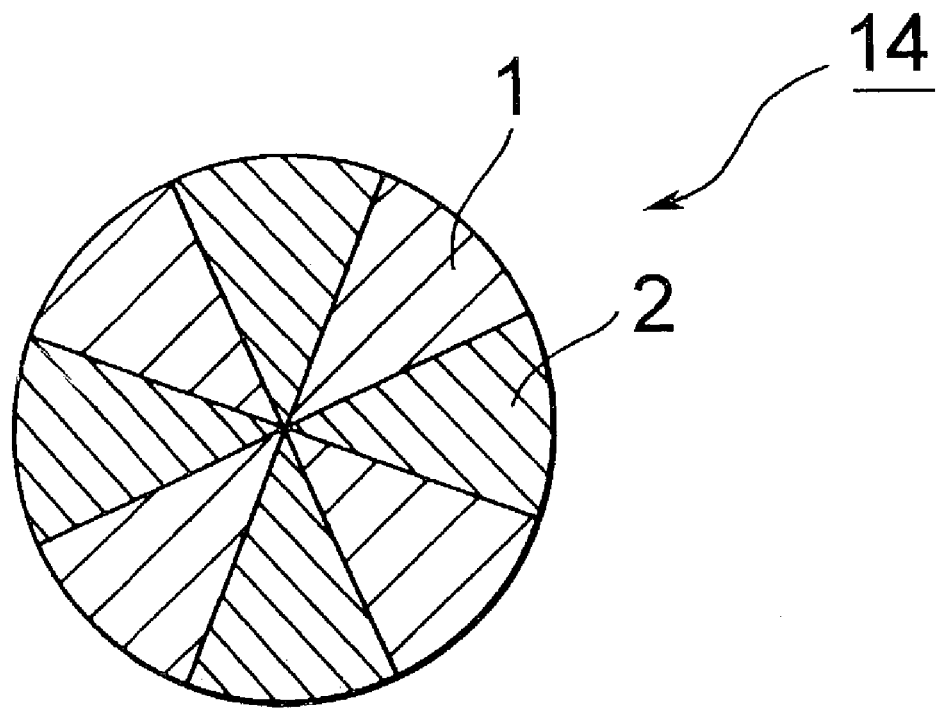
FIG. 4 is a schematic cross-sectional view of an orange type composite fiber which may be used to manufacture the surface material of the present invention.

As the fusible fiber, there may be mentioned, for example, polyester (melting point=approximately 250 to 270° C.)/polyester having a low melting point (melting point=approximately 100 to 150° C.) fusible composite fiber, polyester (melting point=approximately 250 to 270° C.)/polyethylene (melting point=approximately 110 to 140° C.) fusible composite fiber, or polypropylene(melting point=approximately 160 to 175° C.)/polyethylene (melting point=approximately 110 to 140° C.) fusible composite fiber. As the cross-sectional shape of the fusible composite fiber, there may be mentioned, for example, a core-sheath type composite fiber 11 shown in FIG. 1, a side-by-side type composite fiber 12 shown in FIG. 2, a islands-in-sea type composite fiber 13 shown in FIG. 3, a orange type composite fiber 14 shown in FIG. 4, or a multiple bimetal type composite fiber 15 shown in FIG. 5, each consisting of a resin component 1 having a higher melting point and a resin component 2 having a lower melting point. Of the above fusible composite fibers, the core-sheath type (including an eccentric type) composite fiber or the islands-in-sea type composite fiber is preferable, because a fusible area thereof is wide.

When the fiber sheet contains the fusible fibers, it is preferable that the fusible fibers account for 1 mass % or more, more preferably 5 mass % or more, with respect to the whole mass of fibers forming the fiber sheet, because a wear resistance of the surface material can be improved. Further, it is preferable that the fusible fibers account for 50 mass % or less, preferably 20 mass % or less, with respect to the whole mass of fibers forming the fiber sheet, because a large amount of the fusible fibers often causes a poor formability of the surface material, a poor texture by hardening, or a poor designing property.

It is preferable that the fiber sheet contains fine fibers having a diameter of 7 µm or less, as fibers (including non-water absorbent fibers and water absorbent fibers) forming the fiber sheet, because the fiber sheet have a high-density structure which can prevent a polyurethane-based resin from passing therethrough more effectively. The smaller the diameter of the fine fiber, the better the effect. Therefore, it is preferable that the diameter of the fine fiber is 6 µm or less, more preferable 5 µm or less, most preferable 4 µm or less. The lower limit of the fine fiber is not particularly limited, but approximately 0.1 µm is suitable. The term "fiber diameter" as used herein with respect to a fiber having a circular cross-sectional shape means a diameter of the circle. For a fiber having a non-circular cross-sectional shape, a diameter of a circle having an area the same as that of the non-circular cross-sectional shape is regarded as a diameter.

The fine fiber may be formed by any resin components, for example, one or more components of a polyamide-based resin (such as nylon-6 or nylon-66), a polyester-based resin (such as polyethylene terephthalate or polybutylene terephthalate), a polyolefin-based resin (such as polyethylene or polypropylene), or a polyvinylidene chloride based resin. Of the above resins, the polyester-based resin (such as polyethylene terephthalate or polybutylene terephthalate) is preferable, because the fiber sheet containing fine fibers comprising the polyester-based resin exhibits an excellent heat resistance and an excellent weathering resistance. Two or more kinds of fine fibers different from each other with respect to a resin composition and/or a fiber diameter may be used.

The fine fibers as mentioned above may be prepared by, for example, dividing dividable fibers by a physical or chemical action, or a melt blowing method. The physical action may be, for example, a fluid jet, such as a water jet, a calendaring, or a flat-pressing, and the chemical action may be, for example, a removal or swelling of one or more resin components. Of these actions, the physical action used to divide the dividable fiber is preferable, because fine fibers having an excellent strength and a fiber sheet having a high-density structure can be obtained, and thus the fiber sheet can effectively prevent a polyurethane-based resin from passing therethrough.

Figure 5:
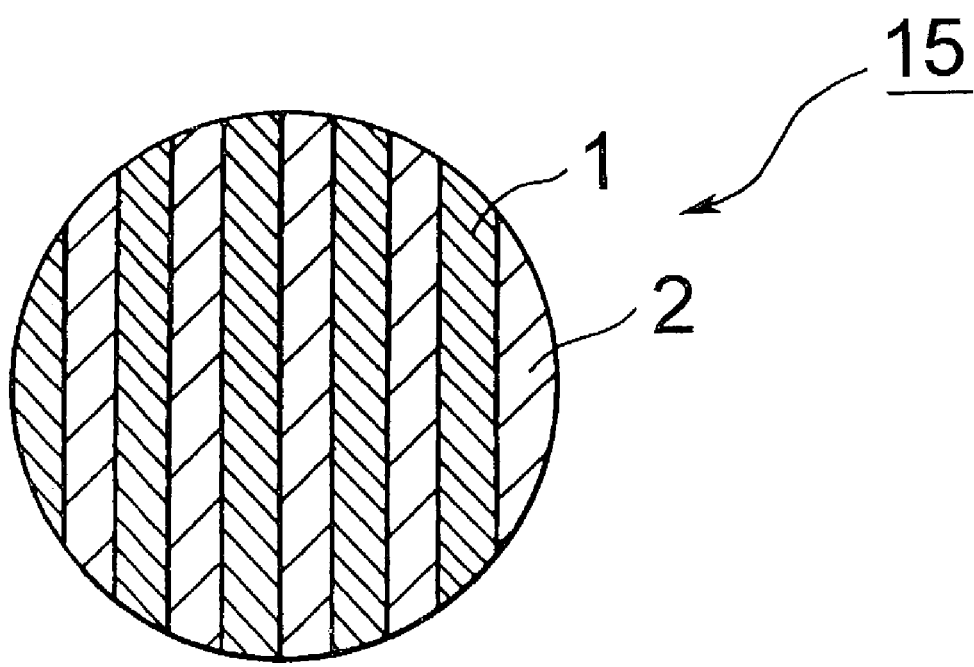
FIG. 5 is a schematic cross-sectional view of a multiple bimetal type composite fiber which may be used to manufacture the surface material of the present invention.

As the fiber dividable by a physical or chemical action, there may be mentioned, for example, a dividable fiber consisting of two or more resin components and having a cross-sectional shape of an orange type (see FIG. 4) or a multiple bimetal type (see FIG. 5). A fineness of the dividable fiber is not particularly limited, so long as the dividable fiber can produce the fine fibers having the above-mentioned diameter.

The larger an amount of fine fibers, the better the effect. Therefore, when the fiber sheet contains fine fibers, it is preferable that the fine fibers account for 50 mass % or more, preferably 80 mass % or more, with respect to the whole mass of fibers forming the fiber sheet.

In the present invention, a dope-dyeing fiber may be used as fibers forming the fiber sheet, to improve a design property.

A fiber length of the fibers forming the fiber sheet may be appropriately selected in accordance with an embodiment of the fiber sheet, and thus is not particularly limited. When the fiber sheet is a nonwoven fabric mainly consisting of staple fibers, the fiber length is preferably 20 to 100 mm, more preferably 30 to 80 mm. When the fiber sheet is a nonwoven fabric mainly consisting of long fibers, the fiber length is preferably more than 100 mm. A fineness of the fibers (excluding fine fibers) forming the fiber sheet may be appropriately selected in accordance with an embodiment of the fiber sheet, and thus is not particularly limited. When the fiber sheet is a nonwoven fabric, the fineness is preferably 0.01 to 33 dtex, more preferably 0.1 to 12 dtex, still further preferably 0.5 to 8 dtex, most preferably 1 to 7 dtex. The term "fiber length" as used herein means a length obtained by a JIS L 1015 (Testing methods for Man-Made staple fibers) B method (a corrected staple diagram method). The term "fineness" as used herein means a fineness obtained by a JIS L 1015 (Testing methods for Man-Made staple fibers) fineness based on corrected weight A method.

As a structure of the fiber sheet constituting the surface material of the present invention, there may be mentioned, for example, a nonwoven fabric, a woven fabric, a knitted fabric (such as a tricot), or a composite fabric thereof. Of the above fabric, the nonwoven fabric is preferable, because it contains three-dimensional voids, and thus the surface material and the base material are strongly adhered to each other by incorporation of a polyurethane-based resin into the voids. As the nonwoven fabric, there may be mentioned, for example, an entangled nonwoven fabric obtained by a needle-punching method or a fluid jet (such as a water jet) entangling method, a partially or wholly fused nonwoven fabric, a melt-blown nonwoven fabric, or a spun-bonded nonwoven fabric, or a composite nonwoven fabric thereof. Of the above nonwoven fabrics, the entangled nonwoven fabric is preferable, because, in addition to the above effects as the nonwoven fabric, an internal trim panel exhibiting a soft texture, a pleasing appearance, and an excellent wear resistance can be manufactured. When the needle-punching treatment is carried out in the present invention, it is preferable that needles are punched only from one surface of the web and the punched surface is not exposed to the opposite surface, i.e., a surface at the side of a passenger compartment, to improve a designing property.

The entanglement used to manufacture the entangled nonwoven fabric may be carried out by a needle-punching method or a fluid jet (particularly water jet) entangling method. Of the above methods, the needle-punching method is preferable, because fibers treated by the needle-punching method tend to orientate in the thickness direction of the entangled nonwoven fabric. As a result, a polyurethane-based resin can easily penetrate the inside of the entangled nonwoven fabric, and thus the surface material and the base material can be strongly adhered to each other by the polyurethane-based resin.

In this connection, when a fiber web to be used for preparing the entangled nonwoven fabric consists of a cross-lay web, fibers forming the cross-lay web overlap with each other sufficiently, in comparison with a unidirectional web, and can effectively prevent a polyurethane-based resin from passing therethrough. Therefore, as the fiber web to be used for preparing the entangled nonwoven fabric, a fiber web comprising the cross-lay web is preferable.

When the entangled nonwoven fabric is used in the surface material of the present invention, it is preferable that the entangled nonwoven fabric has a substantially uniform fiber combination. The expression "substantially uniform fiber combination" as used herein means, when the nonwoven fabric consists of a kind of fiber, the fiber component, the fiber diameter, and the fiber length of fibers forming the nonwoven fabric are substantially the same, and when the nonwoven fabric consists of two or more kinds of fibers, the combination ratio of each fiber having the same fiber component, the same fiber diameter, and the same fiber length is substantially the same. When the entangled nonwoven fabric has a substantially uniform fiber combination, the surface material has a substantially uniform fiber combination, and thus a ply separation in the surface material does not easily occur. As a result, the surface material and the base material are strongly adhered to each other. The entangled nonwoven fabric which has a substantially uniform fiber combination can be manufactured, for example, by entangling a layer of fiber web in which one or more kinds of fibers are uniformly mixed, or by laminating and entangling two or more layers of fiber webs in which one or more kinds of fibers are uniformly mixed and a fiber combination is uniform. The entangled nonwoven fabric manufactured by entangling a layer of fiber web in which one or more kinds of fibers are uniformly mixed is preferable, because a ply separation in the surface material does not easily occur.

An entangled nonwoven fabric having a density-gradient structure is preferable, because when an oil repellent is contained therein as described below, the oil repellent tends to localize in the high-density area of the entangled nonwoven fabric, and a surface material having a density-gradient structure may be obtained. The high-density area in the surface material can prevent a polyurethane-based resin from passing therethrough. The entangled nonwoven fabric having a density-gradient structure can be obtained, for example, by using a needle-punching method as a method for entangling a fiber web. For example, a high-density area layer and a low-density area layer can be formed by changing a depth of the needles when entangling a fiber web. More particularly, the high-density area layer is formed by deeply punching and strongly entangling the fiber web, and the low-density area layer is formed by shallowly punching and weakly entangling the fiber web. Alternatively, a fiber web is treated only from one surface with needles to obtain a raised-fibers web, and then the raised-fibers are bent by pressing (preferably pressing with heating) the raised-fibers web to form a low-density area, and as a result, to form a high-density structure layer and a low-density structure layer.

It is preferable that the high-density area of the entangled nonwoven fabric exists within the entangled nonwoven fabric. The entangled nonwoven fabric in which the high-density area exists within the entangled nonwoven fabric can be manufactured by, for example, a foam impregnation. When an oil repellent is contained in the entangled nonwoven fabric in which the high-density area exists within the entangled nonwoven fabric, the oil repellent localizes in the high-density area, and the surface material in which the high-density area exists within the surface material may be obtained. In the surface material having the high-density area therewithin, both surfaces of the surface material are relatively a low-density area. As a result, a polyurethane-based resin can easily penetrate the low-density area, and thus the surface material and the base material can be strongly adhered to each other by the polyurethane-based resin.

The terms "inside (region) of" or "within" an entangled nonwoven fabric or surface material as used herein means an area at a range of 0.1 to 0.9, when the subject entangled nonwoven fabric or surface material is placed between a base plate having a smooth surface and a flat plate, and a load of 1.96 kPa is applied (the surface at the flat plate side is regarded as "0", and the surface at the base plate side is regarded as "1").

Further, when the entangled nonwoven fabric is used in the surface material of the present invention, it is preferable that the entangled nonwoven fabric has a surface in which fibers orientate in a direction crossing at a right angle to the thickness direction of the entangled nonwoven fabric, because the surface can more effectively prevent the polyurethane-based resin from passing therethrough. The entangled nonwoven fabric having the above surface can be obtained, for example, by using a needle-punching method as a method for entangling a fiber web. More particularly, a fiber web is treated only from one surface with needles to obtain a raised-fibers web, and then the raised-fibers are bent by pressing (preferably pressing with heating) the raised-fibers web to orientate fibers in a direction crossing at a right angle to the thickness direction of the entangled nonwoven fabric. The term "surface" as used herein means an area other than the inside. The term "thickness direction" as used herein means, when an entangled nonwoven fabric or surface material is placed between a base plate having a smooth surface and a flat plate, a direction parallel with a straight line crossing at a right angle to each of the smooth surface and the flat plate.

It is preferable that the fiber sheet used in the present invention is bonded with a binder (hereinafter sometimes referred to as a binder for bonding fibers), because a wear resistance of the surface material can be improved, and thus fluffing rarely occurs or fibers do not easily fall out, when used as an automobile internal panel trim. As the binder for bonding fibers, there may be mentioned, for example, an acrylic resin, a polyvinyl chloride-based resin, an urethane-based resin, a polyester-based resin, an ethylene-vinyl acetate copolymer, an ethylene-vinyl chloride copolymer, an ethylene-vinyl acetate-vinyl chloride copolymer, or an acrylic-styrene-based copolymer. The above binders may be used singly or in combination thereof. A glass transition temperature of the binder is preferably −40 to 50° C., to prevent a soiling of the surface material. The binder may be used as, for example, an emulsion, a suspension, a solution in a solvent, or powder. The binding of the fiber sheet with the binder may be carried out, for example, by immersing the fiber sheet in a binder bath, or by performing a foam impregnation, a spray, a transfer, or a dispersion, if necessary, and then drying.

An amount of the binder (as a solid content) is preferable 0.5 g/m$^2$ or more, more preferably 3 g/m$^2$ or more, to add a sufficient wear resistance, and preferably 100 g/m$^2$ or less, more preferably 20 g/m$^2$ or less, to retain a sufficient formability of the surface material.

An mass per unit area of the fiber sheet used in the present invention is preferably 10 g/m$^2$ or more, more preferably 80 g/m$^2$ or more, to prevent a polyurethane-based resin from passing therethrough. The mass per unit area of the fiber sheet is preferably 500 g/m$^2$ or less, more preferably 220 g/m$^2$ or less, still further preferably 200 g/m$^2$ or less, still further preferably 180 g/m$^2$ or less, most preferably 150 g/m2 or less, to improve a mileage of a car by weight-saving or cut costs. A thickness of the fiber sheet is preferable 0.3 mm or more, more preferably 1 mm or more, to prevent a polyurethane-based resin from passing therethrough, and preferably 10 mm or less, more preferably 3 mm or less, to prevent a ply separation.

The term "mass per unit area" as used herein means mass per unit area measured by a method defined in JIS L1085: 1998.6.2. The term "thickness" as used herein means a value obtained by an A method defined in JIS L1085:1998.6.1 (Thickness).

The surface material of the present invention contains an oil repellent in the above-mentioned fiber sheet, and thus exhibits an oil repellency of grade 1 or more by an action of the oil repellent. The oil repellent is not particularly limited, so long as it can be contained in the fiber sheet and exhibit the above oil repellency. A surface tension of the oil repellency is preferably 18 mN/m or less, more preferably 15 mN/m or less, still further preferably 12 mN/m or less, most preferably 10 mN/m or less. As the oil repellency, a fluoropolymer type oil repellent, particularly a fluoropolymer type oil repellent having one or more perfluoroalkyl groups, may be preferably used.

A content of the oil repellent (as a solid content) is not particularly limited, so long as it can exhibit the above oil repellency grade, but is preferably 0.1 g/m$^2$ or more, more preferably 2 g/m$^2$ or more. Further, it is preferably 50 g/m$^2$ or less, more preferably 10 g/m$^2$ or less, to retain a sufficient adhesiveness between the surface material and the base material by a polyurethane-based resin.

The surface material of the present invention consisting of the fiber sheet containing the above oil repellent preferably has a density-gradient structure, because the high-density area can effectively prevent a polyurethane-based resin from passing therethrough. Particularly, when the oil repellent exists in the high-density area, a synergistic effect of the high-density structure as a physical action and the oil repellent as a chemical action can more effectively prevent a polyurethane-based resin from passing therethrough, and thus is a preferable embodiment. The term "high-density area" as used herein means a area in which a density of materials (such as fibers, the oil repellent, and/or the binder) forming the surface material is relatively higher in comparison with that in the other area. The high-density area can be judged from an electron micrograph of the surface material with respect to a thickness direction.

When the high-density area exists within the surface material, a polyurethane-based resin can easily penetrate the low-density area, which constitutes the surface of the surface material and is relatively low, and thus an automobile internal trim panel wherein the surface material and the base material are strongly adhered to each other can be manufactured. This embodiment is preferable. The high-density area may exist in any position within the surface material, but an area at a range of 0.17 to 0.83 is preferable, and an area at a range of 0.25 to 0.75 is more preferable, because this produces an excellent effect.

The oil repellent used in the present invention preferably satisfies one of the following three features (1) to (3), more preferably two of the three features, most preferable all of the three features:

(1) The oil repellent exists in the high-density area of the surface material.
(2) The oil repellent exists within the surface material.
(3) The oil repellent does not exist on at least one of the surface of the surface material.

The surface material in which the oil repellent exists in the high-density area as described in the above feature (1), or the surface material in which the oil repellent exists within the surface material as described in the above feature (2) may be manufactured, for example, by immersing a fiber sheet (particularly an entangled nonwoven fabric) having the density-gradient structure, in an emulsion of the oil repellent or a solution of the oil repellent in a solvent. The surface material in which the oil repellent does not exist on at least one surface of the surface material as described in the above feature (3) may be manufactured, for example, by performing a foam impregnation, a spray, a transfer, a dispersion, or a print to only one surface of the fiber sheet, using an emulsion of the oil repellent or a solution of the oil repellent in a solvent. The surface material satisfying all of the above three features (1) to (3) may be manufactured, for example, by performing a foam impregnation, using a fiber sheet (particularly an entangled nonwoven fabric) having the density-gradient structure and an emulsion of the oil repellent or a solution of the oil repellent in a solvent.

In the automobile internal trim panel of the present invention, the above-mentioned surface material and the base material are adhered to each other with a polyurethane-based resin, and the polyurethane-based resin does not leak to a surface of the surface material, which is opposite to a surface at the side of the base material. Therefore, a surface of the surface material at the side of a passenger compartment does not yellow for a long time, and thus the appearance thereof is excellent. Further, a sound absorption is also excellent.

The base material is not particularly limited, so long as it can add, for example, a heat resistance, a rigidity, or a dimensional stability to the internal trim panel. As the base material, there may be mentioned, for example, a resin felt, a woodstock (i.e., a sheet consisting of a mixture of 40 to 80 mass % of a polypropylene-based resin and 20 to 60 mass % of a wood waste), a corrugated board, or a foam, or a laminate of one or more of the above materials, or a laminate of one or more of the above materials and one or more materials (such as an entangled nonwoven fabric, a paper, a film split fiber, or fibers). A base material in which a glass fiber layer is carried on one or both surfaces of a foam layer is preferable, because a rigidity of the base material is enhanced by the glass fiber layer carried on one or both surfaces of the foam layer. As the glass fiber layer, there may be mentioned, for example, a laminate prepared by accumulating glass fiber chops, or a glass fiber mat. As the foam layer, a polyurethane foam having continuous cells, which is capable of adding thermal insulating properties or a sound absorption, or the like may be preferably used.

The polyurethane-based resin which may be used to adhere the surface material of the present invention and the base material is not particularly limited, so long as it is a resin having at least one chemical bond selected from the group consisting of a urethane bond, a urea bond, and a biuret bond. As the polyurethane-based resin, there may be mentioned, for example, a polyurethane-based resin in which the urethane bond (—NHCOO—) is formed by a reaction of di-isocyanate and glycol, a polyurethane-based resin in which the urea bond (—NHCONH—) is formed by a reaction of di-isocyanate and water, a polyurethane-based resin in which a biuret bond (—NHCONCONH—) is formed by a reaction of di-isocyanate and a compound having the urea bond, or a polyurethane-based resin in which two or more of the above chemical bonds are formed simultaneously or separately.

The automobile internal trim panel of the present invention in which the surface material and the base material are adhered to each other with the polyurethane-based resin may be manufactured, for example, by the following procedure:

Liquid isocyanate is contained in the base material (for example, a base material in which a glass fiber layer is carried on one or both surfaces of a foam layer), for example, by immersing the base material in liquid isocyanate. A catalyst such as water is dispersed on the base material containing liquid isocyanate, and then the surface material of the present invention is laminated. The laminate is pressed at an appropriate temperature, for example, by a pair of heating and pressing rolls. Liquid isocyanate contained in the base material is reacted with water by the heating and pressing to form a polyurethane-based resin. At the same time, the formed polyurethane-based resin penetrates the surface material, and then the surface material and the base material are adhered to each other.

As the liquid isocyanate, there may be mentioned, for example, an aromatic compounds, such as toluene diisocyanate (TDI), 4,4'-diphenylmethane diisocyanate (Polymeric MDI), 1,5-naphthalene diisocyanate (NDI), tolidine diisocyanate (TODI), paraphenylene diisocyanate (PPDI), xylylene diisocyanate (XDI), tetramethylxylene diisocyanate (TMXDI), or a denaturated thereof.

In the automobile internal trim panel of the present invention, when laminating the surface material and the base material, any surface of the surface material can be brought into contact with the base material, but it is preferable that the surface having a lower grade of the oil repellency is in contact with the base material. In the preferable embodiment, the laminated structure can effectively prevent the polyurethane-based resin from passing therethrough, and further, an internal trim panel having an excellent balance of adhesiveness between the surface material and the base material can be easily manufactured.

An amount of liquid isocyanate contained, an amount of the catalyst such as water dispersed, the heating temperature, or the pressure to be pressed will vary in accordance with, for example, the kind of surface material, the kind of base material, or the kind of liquid isocyanate, and thus is not particularly limited. The above conditions can be appropriately selected by repeating appropriate experiments.

When the internal trim panel of the present invention comprises a non-permeable film on a surface of the base material, which is opposite to a surface at the side of the surface material, the permeability to air of internal trim panel can be inhibited, and thus a soiling of the surface material may be prevented. Further, the sound absorption is not inhibited. In this connection, the non-permeable film may be placed in contact with the base material directly or via one or more other material layers such as a material layer exhibiting an excellent sound absorption.

The term "non-permeable film" as used herein means a film having an air permeability (JIS P 8117) of 1 mL/cm$^2$/sec or less. The film may be formed from, for example, a thermoplastic resin such as polyethylene terephthalate, nylon, polybuthylene terephthalate, polypropylene, or polyethylene.

The above non-permeable film and the base material can be integrated, for example, by a method utilizing a fusibility of the non-permeable film, a method utilizing an adhesiveness of the polyurethane-based resin, or a method in which a hot-melt material such as a hot-melt nonwoven fabric intervenes between the non-permeable film and the base material.

EXAMPLES

The present invention will now be further illustrated by, but is by no means limited to, the following Examples.

Example 1

Non-water absorbent fibers (100%; fineness=2.2 dtex; fiber diameter=14.3 μm; fiber length=51 mm) of polyethylene terephthalate were opened by a carding machine, and then, cross-layered to a direction of a fiber web by a cross-layer to form a cross-layered web (mass per unit area=125 g/m$^2$).

Then, a needle-punching treatment was conducted from only one side of the cross-layered web so that a punching depth became gradually shallower from 12 mm to 5 mm to obtain an entangled fiber web wherein a low-density to high-density structure was formed from the side onto which the needle-punching was applied to the other side, and further, raised fibers were formed on the side opposite to the side onto which the needle-punching was applied.

Thereafter, the resulting entangled fiber web was passed through a pair of rolls (clearance gap=0.5 mm) composed of a heated roll at 150° C. and a non-heated roll so that the surface having raised fibers was brought into contact with the heated roll to press the raised fibers down and form a heated-pressed-entangled fiber web with a surface having fibers orientated in a direction orthogonal to a thickness direction. The resulting heated-pressed-entangled fiber web contained a high-density region in the inside thereof. The inside region ranged from 0.33 to 0.73 when the web was pressed with a load of 1.96 kPa, and a scale "0" was hypothetically marked on the surface having pressed fibers and a scale "1" was hypothetically marked on the opposite surface.

Then, an aqueous emulsion containing an acryl-based binder (glass transition temperature=+2° C.) for fibers and perfluoroalkyl acrylate oil-repellant (surface tension=10 mN/m) was whipped, and coated on the heated-pressed-entangled fiber web at the surface having pressed fibers. The web was dried while a cross-linking of the acryl-based binder for fibers progressed at the same time, to obtain a surface material (mass per unit area=135 g/m$^2$; thickness=1.5 mm). The surface material contained the binder for fibers at an amount of 7.8 g/m$^2$, and the oil-repellant at an amount of 2.2 g/m$^2$.

The resulting surface material contained a density-gradient structure with a high-density region in the inside thereof. The inside region containing the oil-repellant and the binder for fibers ranged from 0.33 to 0.73 when the surface material was pressed with a load of 1.96 kPa, and a scale "0" was hypothetically marked on the surface having pressed fibers and a scale "1" was hypothetically marked on the opposite surface. The surface opposite to the surface having pressed fibers did not contain the oil-repellant or the binder for fibers. The surface having pressed fibers showed an oil-repellant grade of 8, and a water-repellent point of 5, whereas the surface opposite to the surface having pressed fibers showed an oil-repellant grade of 0, and a water-repellent point of 1.

Evaluation of Properties (1) Evaluation of Exudation

A soft polyurethane containing polymeric MDI, dimethylethanol amine, and a fluorescent dye was laminated on a glass fiber sheet A. After water was sprayed on the glass fiber sheet A, a glass fiber sheet B and the surface material prepared in Example 1 were sequentially laminated so that the surface having an oil-repellant grade of 0 was brought into contact with the glass fiber sheet B. Then, the whole was heated and pressed by a pair of heated and pressed rolls to thereby form a polyurethane-based resin by a reaction of polymeric MDI and water, and at the same time, make the polyurethane-based resin invade the inside of the surface material from the glass fiber sheet A. The whole was adhered and integrated to form an internal trim panel T6 having a thickness of about 6 mm (thickness of the soft urethane layer=4 mm) wherein a substrate ranged from the glass fiber sheet A to the glass fiber sheet B.

The procedures disclosed as above were repeated, except that a soft urethane having a larger thickness was used, to obtain an internal trim panel T10 having a thickness of about 10 mm (thickness of the soft urethane layer=8 mm) wherein a substrate ranged from the glass fiber sheet A to the glass fiber sheet B.

The internal trim panel T6 was irradiated with black light from the side of the surface material, 1 hour after the formation of the internal trim panel T6, in order to observe if the polyurethane-based resin was exuded. No exudation of the polyurethane-based resin was observed.

(2) Evaluation of Adhesiveness Between Substrate and Surface Material

A peeling strength of the substrate and the surface material of the internal trim panel T6 was evaluated in accordance with a peeling test defined in JIS K 6829, to obtain a 8.85 N/25 mm width. This showed that the surface material and the substrate were strongly adhered to each other.

(3) Evaluation of Sound Absorption

The sound absorption of each of the internal trim panel T6 and the internal trim panel T10 was measured in accordance with ISO 10534-2 "Acoustics-Determination of sound absorption coefficient and impedance in impedance tubes-, Part 2: Transfer-Function method", by a measuring apparatus of Brüel & Kjær Co., Ltd. The results are shown in Table 1. For reference, a sound absorption of an internal trim panel wherein a hot-melt film was introduced between a substrate and a surface material was also shown.

The results of Table 1 show that the internal trim panel according to the present invention exhibits an excellent sound absorption property.

TABLE 1

| Frequency | Rate of sound absorption (%) | | |
|---|---|---|---|
| (Hz) | A | B | C |
| 500 | 4.5 | 10.4 | 6.0 |
| 1000 | 9.0 | 25.9 | 7.0 |
| 2000 | 20.0 | 57.6 | 12.7 |
| 4000 | 63.3 | 82.6 | 15.4 |
| 5000 | 80.0 | 78.8 | 16.1 |
| 6300 | 94.3 | 72.6 | 17.1 |

A: Internal trim panel T6
B: Internal trim panel T10
C: Film-intervening internal trim panel Comparative Example 1

Non-water absorbent fibers (100%; fineness=2.2 dtex; fiber diameter=14.3 μm; fiber length=51 mm) of polyethylene terephthalate were opened by a carding machine, and then, cross-layered to a direction of a fiber web by a cross-layer to form a cross-layered web (mass per unit area=157 g/m$^2$).

Then, a needle-punching treatment was conducted from only one side of the cross-layered web so that a punching depth became gradually shallower from 12 mm to 5 mm to obtain an entangled fiber web wherein a low-density to high-density structure was formed from the side onto which the needle-punching was applied to the other side, and further, raised fibers were formed on the side opposite to the side onto which the needle-punching was applied.

Thereafter, the resulting entangled fiber web was passed through a pair of rolls (clearance gap=0.5 mm) composed of a heated roll at 150° C. and a non-heated roll so that the surface having raised fibers was brought into contact with the heated roll to press the raised fibers down and form a heated-pressed-entangled fiber web with a surface having fibers orientated in a direction orthogonal to a thickness direction. The resulting heated-pressed-entangled fiber web contained a high-density region in the inside thereof. The inside region ranged from 0.33 to 0.73 when the web was pressed with a load of 1.96 kPa, and a scale "0" was hypothetically marked on the surface having pressed fibers and a scale "1" was hypothetically marked on the opposite surface.

Then, an aqueous emulsion containing an acryl-based binder (glass transition temperature=−30° C.) for fibers and perfluoroalkyl acrylate oil-repellant (surface tension=10 mN/m) was whipped, and coated on the heated-pressed-entangled fiber web at all surfaces from the surface having pressed fibers so that the emulsion leaked to the opposite surface. The web was dried while a cross-linking of the acryl-based binder for fibers progressed at the same time, to obtain a surface material (mass per unit area=167 g/m$^2$; thickness=1.8 mm). The surface material contained the binder for fibers at an amount of 7.8 g/m$^2$, and the oil-repellant at an amount of 2.2 g/m$^2$.

The surface having pressed fibers and the opposite surface contained the oil-repellant and the binder for fibers. The surface having pressed fibers showed an oil-repellant grade of 6, and a water-repellent point of 5, and the surface opposite to the surface having pressed fibers showed an oil-repellant grade of 6, and a water-repellent point of 5.

Evaluation of Properties (1) Evaluation of Exudation

A soft polyurethane containing polymeric MDI, dimethylethanol amine, and a fluorescent dye was laminated on a glass fiber sheet A. After water was sprayed on the glass fiber sheet A, a glass fiber sheet B and the surface material prepared in Comparative Example 1 were sequentially laminated so that the surface opposite to the surface having pressed fibers was brought into contact with the glass fiber sheet B. Then, the whole was heated and pressed by a pair of heated and pressed rolls to thereby form a polyurethane-based resin by a reaction of polymeric MDI and water, and at the same time, make the polyurethane-based resin invade the inside of the surface material from the glass fiber sheet A. The whole was adhered and integrated to form an internal trim panel for a comparison having a thickness of about 6 mm (thickness of the soft urethane layer=4 mm) wherein a substrate ranged from the glass fiber sheet A to the glass fiber sheet B.

The internal trim panel for a comparison was irradiated with black light from the side of the surface material, 1 hour after the formation of the internal trim panel for a comparison, in order to observe if the polyurethane-based resin was exuded. It was confirmed that the polyurethane-based resin was exuded, and thus it could not used as a surface material. Evaluations of an adhesiveness between the substrate and the surface material and a sound absorption were not carried out.

The surface material of the present invention for an automobile internal trim panel has one surface exhibiting an excellent oil repellency, and thus an automobile internal trim panel in which a polyurethane-based resin does not pass through the surface material and a surface does not yellow for a long time can be manufactured. Further, the fiber sheet constituting the surface material substantially consists of non-water absorbent fibers, and thus when liquid isocyanate is reacted with water, and the surface material and the base material are adhered to each other with the polyurethane-based resin formed by the reaction, the adhesiveness therebetween with the polyurethane-based resin is excellent, because the water to be reacted with liquid isocyanate is not absorbed by the non-water absorbent fibers, and as a result, the polyurethane-based resin can be effectively formed. Furthermore, because a grade of the oil repellency of one surface of the surface material is different from that of the other surface thereof, when the surface having a lower grade of oil repellency is placed in contact with the base material, the polyurethane-based resin can easily penetrate the surface material, and thus an automobile internal trim panel wherein the surface material and the base material are strongly adhered to each other may be manufactured.

According to the surface material of the present invention wherein a water repellency of at least one surface of the surface material of the present invention is two points or more in an evaluation by a water repellency test (a spray test) JIS L 1092:1998 6.2, when liquid isocyanate is reacted with water, and the surface material and the base material are adhered to each other with the polyurethane-based resin formed by the reaction, the surface material can prevent water from passing therethrough, and thus can effectively prevent the polyurethane-based resin from passing therethrough.

According to the surface material of the present invention wherein the fiber sheet constituting the surface material consists of an entangled nonwoven fabric, an automobile internal trim panel exhibiting a soft texture, a pleasing appearance, and an excellent wear resistance can be manufactured. According to the surface material of the present invention wherein the entangled nonwoven fabric has a substantially uniform fiber combination, the surface material and the base material are sufficiently adhered to each other, because a ply separation in the surface material does not easily occur.

According to the surface material of the present invention wherein the fiber sheet has a density-gradient structure, the high-density area can effectively prevent the polyurethane-based resin from passing therethrough. Particularly, when the oil repellent is contained in the high-density area, a synergistic effect of the high-density structure as a physical action and the oil repellent as a chemical action can more effectively prevent the polyurethane-based resin from passing therethrough. Further, the high-density area exists within the fiber sheet, and the surface material and the base material are sufficiently adhered to each other, because the polyurethane-based resin can easily penetrate the low-density area.

According to the automobile internal trim panel of the present invention, a surface of the surface material at the side of a passenger compartment does not yellow for a long time, and thus the appearance thereof is excellent. Further, a sound absorption is also excellent.

According to the automobile internal trim panel of the present invention wherein a non-permeable film is carried on a surface of the base material, which is opposite to a surface at the side of the surface material, in addition to the above effects, a soiling of the surface material is prevented by inhibiting an air permeability thereof.

As above, the present invention was explained with reference to particular embodiments, but modifications and improvements obvious to those skilled in the art are included in the scope of the present invention.

The invention claimed is:

1. A surface material for an automobile internal trim panel consisting essentially of a fiber sheet, wherein said fiber sheet has a density-gradient structure having a high-density area within the fiber sheet; said fiber sheet contains an oil repellent having a surface tension of 18 mN/m or less and substantially consists of non-water absorbent fibers; an oil repellency and a water repellency of one surface of said surface material is grade 1 or more in an evaluation by an AATCC Test method 118-1997 and two points or more in an evaluation by a water repellency test (a spray test) JIS L 1092:1998 6.2, respectively; an oil repellency and a water repellency of the other surface of said surface material is grade 0 and one point, respectively; a grade of the oil repellency of one surface of said surface material is different from that of the other surface thereof; and said oil repellent is contained in said high-density area.

2. The surface material according to claim 1, wherein said fiber sheet consists essentially of an entangled nonwoven fabric.

3. The surface material according to claim 2, wherein said entangled nonwoven fabric has a substantially uniform fiber combination.

4. The surface material according to claim 1, wherein a mass per unit area of said fiber sheet is 200 g/m$^2$ or less.

5. An automobile internal trim panel comprising the surface material according to claim 1 and a base material, wherein said surface material and said base material are adhered to each other with a polyurethane-based resin having at least one chemical bond selected from the group consisting of a urethane bond, a urea bond, and a biuret bond; and the polyurethane-based resin does not leak to a surface of the surface material, said surface being opposite to a surface at the side of the base material.

6. The automobile internal trim panel according to claim 5, having a non-permeable film on a surface of said base material, said surface being opposite to a surface at the side of said surface material.

* * * * *